United States Patent [19]

Miyazaki et al.

[11] Patent Number: 4,565,670

[45] Date of Patent: Jan. 21, 1986

[54] HEAT TREATING APPARATUS USING MICROWAVES

[75] Inventors: Hitoshi Miyazaki, Katsuta; Katsuyuki Ohtsuka, Mito; Kazutoshi Miyata, Hitachiota, all of Japan

[73] Assignee: Doryokuro Kakunenryo Kaihatsu Jigyodan, Tokyo, Japan

[21] Appl. No.: 489,410

[22] Filed: Apr. 26, 1983

[30] Foreign Application Priority Data

May 6, 1982 [JP] Japan .................... 57-75755

[51] Int. Cl.⁴ ............................... G21F 9/08
[52] U.S. Cl. ..................... 422/186.04; 34/1;
34/4; 34/22; 219/10.55 A; 252/626; 252/632;
422/186.09; 422/186.18; 422/186.23; 422/903;
422/159
[58] Field of Search ............ 34/1, 4, 22, 32, 40,
34/82; 422/159, 186.04, 186.08, 186.09, 186.18,
186.23, 903; 252/626, 631, 632; 219/10.55 R,
10.55 A

[56] References Cited

U.S. PATENT DOCUMENTS

| 4,087,921 | 5/1978 | Blok | 34/1 |
| 4,103,431 | 8/1978 | Levinson | 34/1 |
| 4,126,945 | 11/1978 | Manser | 34/4 |
| 4,182,050 | 1/1980 | Righi | 34/4 |
| 4,221,680 | 9/1980 | Hardwick et al. | 252/626 |
| 4,330,946 | 5/1982 | Courneya | 34/17 |
| 4,370,534 | 1/1983 | Brandon | 34/1 |
| 4,400,604 | 8/1983 | Ohtsuka et al. | 34/1 |
| 4,439,318 | 3/1984 | Hayashi et al. | 422/159 |

Primary Examiner—Stephen J. Lechert, Jr.
Assistant Examiner—Howard J. Locker
Attorney, Agent, or Firm—Wenderoth, Lind & Ponack

[57] ABSTRACT

A heat treating apparatus using microwaves for continuously treating a substance containing nuclear materials with consideration of the criticality safety of the nuclear materials. The apparatus has a stationary outer cylinder and a rotatable inner cylinder to form therebetween an annular passage for the continuous heat treatment of the substance. The outer cylinder has inlet and outlet ports for the material and at least one microwave waveguide. The material supplied into the annular passage is heat treated and transferred to the outlet port during rotation of the inner cylinder.

9 Claims, 2 Drawing Figures

HEAT TREATING APPARATUS USING MICROWAVES

BACKGROUND OF THE INVENTION

The present invention relates in general to a heat treating apparatus using microwaves for continuously treating a substance containing nuclear materials with consideration of the criticality safety of the nuclear materials, and more particularly to a heat treating apparatus using microwaves for continuously heat treating a solution and/or slurry containing nuclear materials such as plutonium, uranium and so forth, in nuclear fuel production facilities or spent fuel reprocessing facilities. The term "heat treating" is used herein with its generic meaning including various treatments effected by heating such as evaporation, drying, roasting, reduction, thermal denitrating and so forth, as well as various treatments conducted simultaneously with heating, such as mixing and crushing.

The nuclear fuel materials such as plutonium, uranium and so forth which are handled in nuclear fuel production facilities and recovered in spent fuel reprocessing facilities are generally in the form of a solution and, in some cases, in the form of a slurry. In a currently used method of thermally denitrating these substances, they are placed in a planar dish of a predetermined depth which is determined by taking the criticality safety thereof into consideration, and microwaves are applied directly to the substances. In the heat treatment using microwaves, the nuclear material, unlike when it is heated by steam or by electric devices, is heated directly, and it provides an improvement in the heating efficiency and allows the heating time to be minimized. This reduces the exposure to the nuclear materials and provides a uniform temperature distribution. As a result, a powder having excellent properties can be obtained. However, in the conventional heating system using microwaves as described above, the nuclear material which is treated by a batch process cannot be treated at a high rate, and it is impossible to continuously treat the material.

There have been several attempts at processing nuclear material at an increased rate, such as, for example, a method of simultaneously heating nuclear material placed in a plurality of suitably arranged dishes, and a supposed method of using an ordinary rotary kiln used in various conventional heat-treating methods. The former method requires a larger installation and facilities, and the latter does not provide a reliably high criticality safety. Therefore, it is difficult to employ these methods in practice.

Under the circumstances, there is a strong demand for the development of a compact heat treating apparatus of the type concerned, which has a higher processing rate and which is capable of controlling the criticality safety of the nuclear material.

The present invention has been developed in view of the actual conditions and circumstances of the prior art.

SUMMARY OF THE INVENTION

An object of the present invention is to provide an improvement in a heat treating apparatus using microwaves.

Another object of the present invention is to provide an improved heat treating apparatus having a higher processing rate.

A further object of the present invention is to provide continuous processing heat treating apparatus which permits maintaining the criticality safety of the nuclear material.

Another object of the present invention is to provide a new heat treating apparatus using microwaves for continuously heat treating, such as drying, roasting etc., a solution and/or slurry which contains a radioactive material.

An additional object of the present invention is to provide a new heating apparatus using microwaves which permits a reduction in the size of nuclear fuel production facilities and spent fuel reprocessing facilities.

Briefly, a heat treating apparatus using microwaves according to the present invention has an annular passage formed by the combination of a stationary outer cylinder and a rotatable inner cylinder mounted coaxially within the outer cylinder. The annular passage has a predetermined thickness defined by taking the criticality safety of the nuclear materials into consideration. The outer cylinder has an inlet pipe at one end and outlet port at the other, at least one waveguide of for microwaves, and a gas discharge port. The apparatus is adapted for heating, with microwaves, a solution or slurry, hereinafter referred to simply as a "solution", containing a radioactive material introduced into the annular passage through the inlet.

In an embodiment of the invention, the heating apparatus has a device for transferring the material from the inlet to the outlet port of the outer cylinder. The transferring device preferably has a scraper consisting of a helical vane which is helically and substantially coaxially projecting outwardly from an outer surface of the inner cylinder. The scraper is rotated in a frictional contact with the inner surface of the outer cylinder to remove substances adhered to the inner surface and to facilitate the transferring of the material towards the outlet port.

It is preferred that the apparatus, which is in an elongated tubular form, is installed such that the elongated annular passage is inclined along the longitudinal axis thereof in such a manner that the end of the passage closer to the inlet pipe is located higher than the other end closer to the outlet port.

It is also preferred that the microwave guides are connected at three positions, i.e. an inlet end position, an intermediate position and an outlet end position, of the circumference of the outer cylinder.

In order to improve the criticality safety, the inner cylinder may preferably contain a neutron poison.

In another embodiment of the invention, a number of balls for pulverizing the material are provided in the annular passage and the annular passage is divided into plural sections by reticulated or perforated plates which are designed to permit both microwaves and the material to be treated to pass therethrough but do not permit the balls to pass therethrough. In this embodiment, it is necessary that the apparatus is installed in an inclined posture such that the end of the passage closer to the inlet pipe is higher than the other end closer to the outlet port. However, in this embodiment, agitating elements are provided for agitating the balls during rotation of the inner cylinder.

Additional objects and features of the present invention will become apparent from the detailed description of preferred embodiments of the invention, which will be made with reference to the accompanying drawing.

PREFERRED EMBODIMENT OF THE INVENTION

Figure 1:
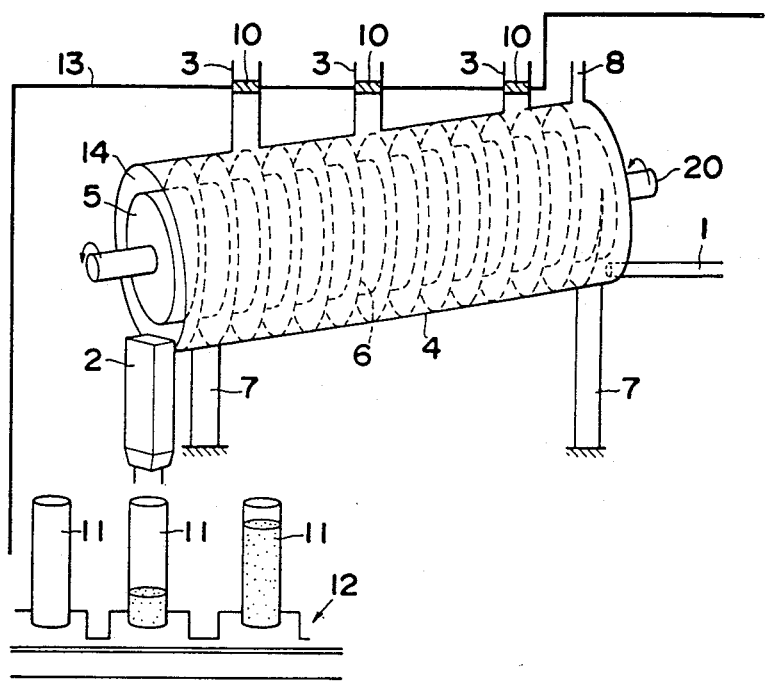
FIG. 1 is an explanatory perspective view of a heat treating apparatus embodying the present invention.

In FIG. 1 which shows an embodiment of the invention, a heat treating apparatus has an outer cylinder 4 which is fixedly mounted on supports 7 and provided with an inlet pipe 1 for the material to be subjected to heat treatment at one end thereof, an outlet or discharge port 2 for the treated material at the other end, and waveguides 3 for guiding microwaves connected to the circumferential wall of the outer cylinder. The apparatus further has a rotatable inner cylinder 5 mounted coaxially within the outer cylinder so as to form an annular passage 14 between the inner and outer cylinders and a suitable device for transferring the material supplied by the inlet pipe 1 to the passage 14 to the discharge port 2. In the illustrated embodiment of FIG. 1, the transfer device is in the form of a scraper 6 constituted by a helical vane, which projects helically outwardly from the outer surface of the inner cylinder 5 and is adapted to be rotated in sliding contact with the inner surface of the outer cylinder. The scraper 6 functions to remove or scrape off substances adhered to the inner surface of the outer cylinder during operation, and also to transfer the substances towards the discharge port 2. The annular passage defined between by the outer and inner cylinders is supported in an inclined posture such that the end of the annular passage closer to the inlet pipe 1 is higher than the other end which is closer to the discharge port 2. Reference numeral 8 designates a gas discharge port fixed to an upper portion of the end closer to the inlet pipe 1. The waveguides 3 for the microwaves are connected at three positions, i.e. the inlet end position, the outlet end position and an intermediate position, of the circumferential wall of the outer cylinder 4. In FIG. 1 of the drawings, reference numeral 10 designates members provided within the waveguides for preventing radioactive material from flowing backward, which members are made of a microwave transmissive material. Under the discharge port 2 is provided a vessel transferring unit 12 such as, for example, a belt conveyor or the like for transferring in order a plurality of vessels 11 which are designed to have a size and shape for a criticality safety. The heat treating apparatus as a whole is provided in a glove box, designated by reference numeral 13, to prevent contamination of the atmosphere. As will be appreciated by those skilled in the art, a driving device, not illustrated, for rotating the inner cylinder 5 is connected to a shaft 20 of the inner cylinder.

The operation of the heat treating apparatus shown in FIG. 1 will now be described. A solution containing a radioactive material, such as uranium and/or plutonium, is fed from the inlet pipe 1 into the annular passage 14. Because of the transfer device having the scraper 6 and with the aid of the inclination of the annular passage, the material being heat treated is transferred to the outlet end of the annular passage as the inner cylinder 5 rotates, and is continuously heat treated so that it is converted from a substance in the form of a solution into a dried substance and then into a roasted substance. The waste gas generated in this process is exhausted through the gas discharge port 8 into a waste gas treatment system (not shown) for disposal. During the drying step, the material being treated is liable to adhere to the inner surface of the outer cylinder 4. When the material adheres to the inner surface of the outer cylinder 4, it is scraped and removed by the action of the scraper and transferred forcibly to the outlet of the annular passage 14. The scraper 6 in the form of a helical vane has the function to transfer the material as described and the transfer speed can be controlled by simply varying the rotational speed of the scraper. The criticality safety of the nuclear material can be reliably controlled since the nuclear material mass is divided by the helical vane and defined by the size of the annular passage 14 while the material is transferred. To this end the distance between the spires of the vane parallel to the axis of the cylinder and the radial dimension of the axial passage define a space between the spires of the vane having a size for limiting the amount of material to be treated to less than that necessary for maintaining criticality safety of the material being treated. The treated material which is now in the form of a roasted substance is discharged from the discharge port 2 and recovered in the vessels 11 having a size and shape for a criticality safety. As will be appreciated by those skilled in the art, the vessels may have any shape other than the cylindrical shape as illustrated in FIG. 1 if they are designed in light of the criticality safety. The vessels 11 are transferred rapidly, but the rotation of the inner cylinder 5 is preferably interrupted in synchronism with the vessel transfer action, or alternatively a shutter (not shown) may be provided in the discharge port 2 and actuated in synchronism with the vessel transfer action, to stop supplying the treated material temporarily. This prevents the roasted substance from scattering out of the vessels.

The processing rate can be varied to a certain extent by regulating or selecting the number of waveguides and the level of the microwave power. The criticality safety can be improved when the inner cylinder is formed such that the interior thereof contains a neutron poison such as, for example, compounds of boron or gadolinium. The diameters and lengths of the inlet pipe 1, the discharge port 2, and the discharge gas pipe 8 are selectively determined such that microwaves do not propagate through these elements, so as to prevent the leakage of microwaves.

Figure 2:
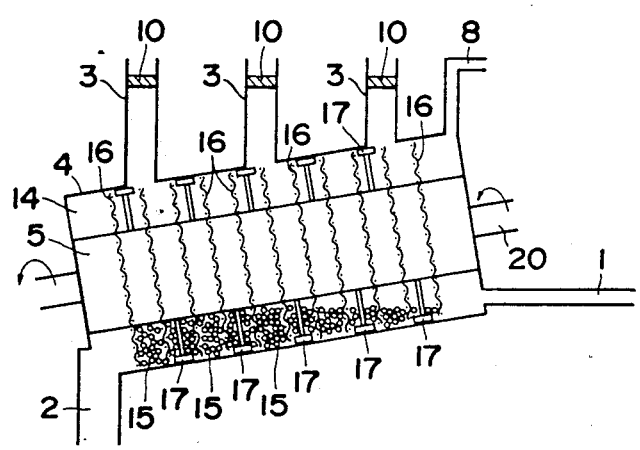
FIG. 2 is an explanatory sectional view of a modified structure of the apparatus according to another embodiment of the invention.

FIG. 2 shows another embodiment of the invention, which is basically identical to the embodiment of FIG. 1 except for the construction of the inner part of the annular passage defined by the center and inner cylinders. The same reference numerals are affixed to the same or similar parts and elements as those of the previous embodiment of FIG. 1.

In the modified structure of FIG. 2, a heat treating apparatus using microwaves has an outer cylinder 4 and a rotatable inner cylinder 5. The outer cylinder 4 has an inlet pipe 1 connected to one end thereof, a discharge port 2 for recovering the treated material at the other end thereof, microwave waveguides 3 and a gas discharge port 8. The rotatable inner cylinder 5 is coaxially mounted within the outer cylinder 4 to form an annular longitudinal passage 14 therebetween.

The annular passage 14 is inclined in such a manner that the end of annular passage closer to the inlet pipe 1 is positioned higher than the other end which is closer to the discharge port 2. Within the annular passage are provided a number of balls for pulverizing the material, the details of which will be explained presently. The annular passage 14 is divided into a plurality of sections by a plurality of partitions such as reinforced reticulate members 16 or perforated rigid plates. The partitions or reticulate members 16 extend at right angles to a rotary shaft 20 of the inner cylinder 5, and each of which are formed such that they permit microwaves and the material being treated to pass therethrough, but do not permit the pulverizing balls to pass therethrough. They are spaced in the same way as the spires of the vane 6 to limit the size of the spaces therebetween. The reticulate members 16 may fixed to the outer surface of the inner cylinder 5 so that the reticulate members 16 are rotated together with the inner cylinder 5, or alternatively rigidly fixed to the inner surface of the stationary outer cylinder 4. The balls 15 for agitating and pulverizing the material within the annular passage 14 are provided in each of the divided spaces, but the number of balls increases progressively as the sections are positioned closer to the discharge port 2, as schematically illustrated.

In the structure of the embodiment shown in FIG. 2, there is provided a plurality of agitators 17 which extend outwardly from the outer surface of the inner cylinder 5 for agitating the balls 15 during rotation of the inner cylinder. It is preferred that the agitators 17 extend outwardly sufficiently far to be in a slight contact with the inner surface of the outer cylinder 4 so that the extended end of the agitator 17 has the function of a scraper and can successfully scrape the material adhered to the inner surface of the outer cylinder.

The operation of the apparatus illustrated in FIG. 2 is substantially similar to that of the previous embodiment of FIG. 1. A solution containing a radioactive material is fed into the annular passage 14 through the inlet pipe 1 and heated with microwaves applied thereto through the waveguides 3. Since the annular passage 14 is inclined and, in addition, balls 15 and agitators 17 are provided therein, the material is transferred to the outlet end of the annular passage as the inner cylinder rotates. Thus, the material is heat treated and converted from a substance in the form of a solution into a dried substance and finally to a roasted substance. The gas generated in this process is exhausted through the gas discharge port 8 into a waste gas treatment system (not shown) for disposal. When the material, which is liable to adhere to the inner surface of the outer cylinder 4, is adhered to the inner surface, it is removed by the scraping action of the agitators 17, which also serve as scrapers. The material thus removed from the inner surface of the outer cylinder 4 is pulverized by the balls and transferred towards the outlet end of the annular passage 14 through the partitions such as reticulate members 16. In the intermediate and outlet sections of the annular passage, the pulverizing balls 15 are agitated by agitators 17 during rotation of the inner cylinder 5, and the balls drop to the bottom of each section of the passage 14 to thereby cause the dried substance to be pulverized. Further, the balls 15 also serve to improve the drying efficiency. In the final step of the process, a fully roasted substance is transferred to the outlet end of the annular passage and recovered from the discharge port 2. The treated material flowing from the discharge port 2 is supplied to vessels, which have predetermined shapes and size to meet the criticality safety.

In order to improve further the safety, the pulverizing balls 15 and/or the interior of the inner cylinder 5 preferably contain a neutron poison. Other structural and operational features are considered to be substantially similar to those of the previous embodiment of FIG. 1 and will be appreciated from the foregoing description.

In the heat treating apparatus according to the present invention, a solution containing a radioactive material is continuously dried and a powdered product having excellent properties can be obtained. Moreover, the processing rate can be improved to a great extent, and the nuclear installations such as nuclear fuel production facilities and spent fuel reprocessing facilities can be reduced in size. Besides, criticality safety of the equipment, which is one of the most important concerns in the field, is completely ensured.

Although the present invention has been described with reference to the preferred embodiments thereof, many modifications and alterations may be made within the spirit of the invention.

What is claimed is:

1. A heat treating apparatus using microwaves for continuously treating a substance which contains nuclear materials, comprising:
    a stationary outer cylinder having an inlet port at one end thereof, an outlet port at the other end thereof, and a gas discharge port;
    an inner cylinder coaxially rotatably mounted within said outer cylinder;
    said apparatus having an annular passage defined between said outer cylinder and said inner cylinder through which the materials to be treated are caused to pass for being heat treated;
    waveguide means opening into said annular passage for guiding microwaves into said annular passage; and
    a helical vane on said inner cylinder extending along substantially the entire length of the outer surface of said inner cylinder and projecting radially outwardly from the outer surface of said inner cylinder a distance such that the outer end thereof is movable in frictional contact with the inner surface of said outer cylinder when said inner cylinder is rotated for transferring the material to be treated along said annular passage from said inlet port to said outlet port, the distance between the spires of said vane parallel to the axis of said cylinders and the radial dimension of said annular passage defining a space between the spires of said vane having a size for limiting the amount of material to be treated to less than that necessary for maintaining criticality safety of the material being treated.

2. A heat treating apparatus as claimed in claim 1 in which the axes of said cylinders and said annular passage are inclined downwardly from the inlet port end to the outlet port end of said outer cylinder.

3. A heat treating apparatus as claimed in claim 1 wherein said waveguide means comprieses a plurality of waveguides, a first waveguide being connected to said outer cylinder adjacent the inlet port end thereof, a second waveguide being connected to said outer cylinder adjacent the outlet port end thereof, and an intermediate waveguide being connected to said outer cylinder between said first and second waveguides.

4. A heat treating apparatus as claimed in claim 1 further comprising a neutron poison contained in said inner cylinder.

5. A heat treating apparatus using microwaves for continuously treating a substance which contains nuclear materials, comprising:
- a stationary outer cylinder having an inlet port at one end thereof, an outlet port at the other end thereof, and a gas discharge port;
- an inner cylinder coaxially rotatably mounted within said outer cylinder;
- said apparatus having an annular passage defined between said outer cylinder and said inner cylinder through which the materials to be treated are caused to pass for being treated, the axes of said cylinders and said annular passage are inclined downwardly from the inlet port end to the outlet port end of said outer cylinder;
- waveguide means opening into said annular passage for guiding microwaves into said annular passage;
- a plurality of partition means on said inner cylinder spaced at intervals along substantially the entire length of the outer surface of said inner cylinder and projecting radially outwardly from the outer surface of said inner cylinder a distance such that the outer end thereof is at the inner surface of said outer cylinder, said partition means having apertures therein for permitting the material to be treated to pass therethrough, the distance between said partition means parallel to the axis of said cylinders and the radial dimension of said annular passage defining a space between the partition means having a size for limiting the amount of material to be treated to less than that necessary for maintaining criticality safety of material being treated;
- balls in each of said spaces and freely movable in said spaces, said balls being larger than the apertures in said partition means so that the balls do not pass through the partition means; and
- agitators in each of said spaces for agitating said balls during rotation of said inner cylinder.

6. A heat treating apparatus as claimed in claim 5 wherein each partition means is a reinforced reticulate member projecting outwardly from the outer surface of said inner cylinder toward said outer cylinder.

7. A heat treating apparatus as claimed in claim 5 wherein each partition means is a perforated plate projecting outwardly from the outer surface of said inner cylinder toward said outer cylinder.

8. A heat treating apparatus as claimed in claim 5 further comprising a neutron poison contained in said inner cylinder.

9. A heat treating apparatus as claimed in claim 5 further comprising a neutron poison contained in said balls.

* * * * *